(12) United States Patent
Iqbal et al.

(10) Patent No.: US 12,061,094 B2
(45) Date of Patent: Aug. 13, 2024

(54) AI BASED CHANGE DETECTION SYSTEM FOR EXECUTING A METHOD TO DETECT CHANGES IN GEO-TAGGED VIDEOS TO UPDATE HD MAPS

(71) Applicant: NavInfo Europe B.V., Eindhoven (NL)

(72) Inventors: Haris Iqbal, Eindhoven (NL); Shruthi Gowda, Eindhoven (NL); Ahmed Badar, Eindhoven (NL); Terence Brouns, Eindhoven (NL); Arnav Varma, Eindhoven (NL); Elahe Arani, Eindhoven (NL); Bahram Zonooz, Eindhoven (NL)

(73) Assignee: NavInfo Europe B.V., Eindhoven (NL)

( * ) Notice: Subject to any disclaimer, the term of this patent is extended or adjusted under 35 U.S.C. 154(b) by 204 days.

(21) Appl. No.: 17/674,596

(22) Filed: Feb. 17, 2022

(65) Prior Publication Data

US 2023/0258471 A1 Aug. 17, 2023

(51) Int. Cl.
  *G01C 21/32* (2006.01)
  *G01C 21/00* (2006.01)
  *G06N 3/08* (2023.01)
  *G06V 20/56* (2022.01)
  *G06V 20/58* (2022.01)

(52) U.S. Cl.
  CPC ........ *G01C 21/3815* (2020.08); *G01C 21/32* (2013.01); *G06N 3/08* (2013.01); *G06V 20/582* (2022.01); *G06V 20/588* (2022.01)

(58) Field of Classification Search
  CPC .............. G01C 21/3815; G01C 21/32; G01C 21/3841; G06N 3/08; G06V 20/582; G06V 20/588; G06T 9/00
  See application file for complete search history.

(56) References Cited

U.S. PATENT DOCUMENTS

| 9,363,462 | B2 | 6/2016 | Yoel | |
| 10,803,324 | B1* | 10/2020 | Shen | G05D 1/0246 |
| 11,551,099 | B1* | 1/2023 | Senthil | G06N 3/088 |
| 2014/0111647 | A1* | 4/2014 | Atsmon | G08G 1/14 |
| | | | | 348/148 |
| 2019/0271550 | A1* | 9/2019 | Breed | F21S 41/13 |

OTHER PUBLICATIONS

Diego, Ferran, et al., "Video Alignment for Change Detection", IEEE Transactions on Image Processing, vol. 20, No. 7, 2011, 1858-1869.

(Continued)

*Primary Examiner* — Keith D Bloomquist
(74) *Attorney, Agent, or Firm* — Peacock Law P.C.; Justin R. Muehlmeyer

(57) ABSTRACT

An AI based change detection system for executing a method to detect changes in geo-tagged videos to update HD maps, the method employing a neural network of modular components including a keyframe extraction module for processing two or more videos relating to separate traversals of an area of interest to which the HD map which is to be updated relates, a deep neural network module processing output of the keyframe extraction module, a change detection module processing output of the deep neural network module, and an auxiliary computations module which is designed to aid the change detection module.

7 Claims, 15 Drawing Sheets

(56) References Cited

OTHER PUBLICATIONS

Ferri, Federico, et al., "Dynamic obstacles detection and 3D map updating", 2015 IEEE/RSJ International Conference on Intelligent Robots and Systems (IROS), 2015, 5694-5699.

Kim, Chansoo, et al., "Updating Point Cloud Layer of High Definition (HD) Map Based on Crowd-Sourcing of Multiple Vehicles Installed LiDAR", IEEE Access, vol. 9, 2021, 8028-8046.

Michael, Matthias, et al., "Fast Change Detection for Camera-based Surveillance Systems", 2016 IEEE 19th International Conference on Intelligent Transportation Systems (ITSC), 2016, 2481-2486.

Pannen, David, "HD Map Change Detection with a Boosted Particle Filter", 2019 International Conference on Robotics and Automation (ICRA), 2019, 2561-2567.

Pannen, David, et al., "How to Keep HD Maps for Automated Driving Up to Date", 2020 IEEE International Conference on Robotics and Automation (ICRA), 2020, 2288-2294.

Underwood, J. P., et al., "Explicit 3D change detection using ray-tracing in spherical coordinates", 2013 IEEE International Conference on Robotics and Automation, 2013, 4735-4741.

Wellhausen, Lorenz, et al., "Reliable real-time change detection and mapping for 3D LiDARs", 2017 IEEE International Symposium on Safety, Security and Rescue Robotics (SSRR), 2017, 81-87.

Zhanabatyrova, Aziza, et al., "Automatic Map Update Using Dashcam Videos", arXiv:2109.12131v2, 2022, 1-27.

Zhang, Pan, et al., "Real-Time HD Map Change Detection for Crowdsourcing Update Based on Mid-to-High-End Sensors", Sensors, vol. 2, Issue 7, 2021, 1-12.

Varghese, Ashley, et al., "ChangeNet: A Deep Learning Architecture for Visual Change Detection", Advances in Databases and Information Systems; [Lecture Notes in Computer Science; Lect. Notes Computer], Springer International Publishing, Cham, 2019, 129-145.

* cited by examiner

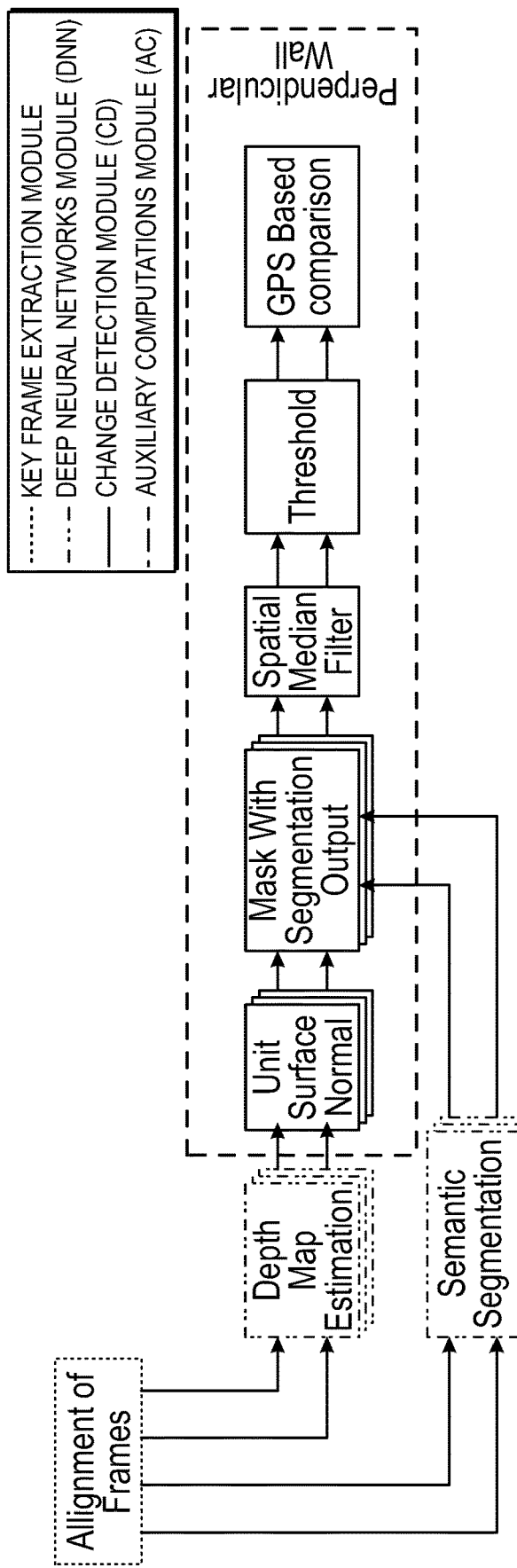
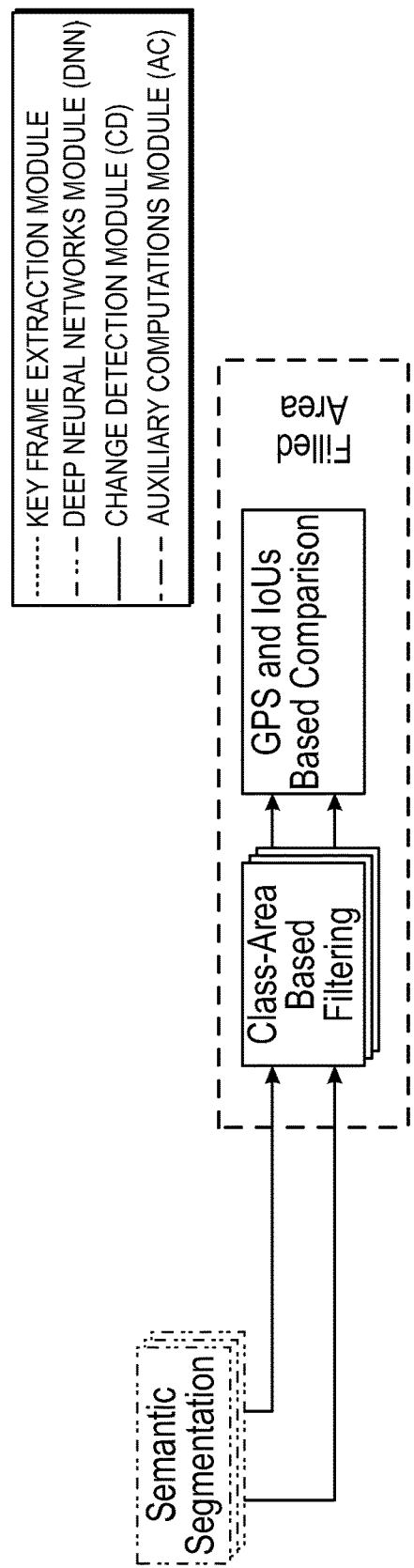
FIG. 6
FIG. 7

AI BASED CHANGE DETECTION SYSTEM FOR EXECUTING A METHOD TO DETECT CHANGES IN GEO-TAGGED VIDEOS TO UPDATE HD MAPS

BACKGROUND OF THE INVENTION

Field of the Invention

The invention relates to an artificial intelligence AI based change detection system for executing a method to detect changes in geo-tagged videos to update HD maps.

Autonomous Driving Systems (ADS) need to be able to traverse environments with little to no human input. High Definition (HD) Maps are vital to ADS for such traversals. HD Maps are very precise maps (with precision in cm) that are constructed to get a better understanding of their surroundings. To ensure safety, the HD maps need to be maintained and updated constantly. For example, if a lane marking is changed from dashed to solid and this change does not get updated in the maps, ADS can take undesirable decisions on the road resulting in disastrous consequences. Similarly, changes such as those in traffic signs, such as speed limits, or addition of road-barriers on a route are also vital from a safety perspective.

Background Art

The references discussed below provide different ways to update HD maps.

A standard way of updating HD maps is using LiDar Sensors [1]. Dedicated high end Lidar vehicles, equipped with a few other sensors, traverse a path in the HD map to collect a Point Cloud Map(PCM). Most of the current approaches to find changes and update HD maps focus on finding changes in this PCM and the existing HD maps [1, 2, 3, 4]. However, this approach is very expensive and detrimental to the environment [1, 9].

Zhang et. al [9] designed a change detection system without the expensive LIDAR sensors but still use mid-to-high-end sensors. They require an industrial camera, a commercial high-end navigation satellite system, an inertial measurement unit (IMU) and an onboard computing platform for the solution. As these sensors add to the cost, this approach is not a cost-efficient solution. Later systems developed by Pannen et. Al [7][8] use Floating Car Data to either detect changes in specific types of objects such as Reflector posts, or use ground-truth labels to learn general-purpose changes. Furthermore, in these methods the features in which changes are identified are assumed to be provided through sensors.

Early methods for change detection using RGB videos (Diego et. Al[5], Michael et. Al[6]) focused on extracting regions in images where changes occurred. However, these methods need robust registration of traversal sequences and do not identify specific objects changes. Furthermore, they need further registration of changes in 3D to update the HD Maps.

Eschewing the requirement for ground-truth and sensor-identified features, and forgoing image co-registration registration artifacts, Zhang et. al[9] and Zhanabatyrova et. al [10] have combined 3d reconstruction methods with deep neural networks trained offline on publicly available datasets to identify changes in specific types of features from RGB video frames. In these methods changes are extracted by registering and comparing the 3D reconstruction and the HD Maps for detected changes in areas of interest. The advantage of these methods is that they can be easily adapted to detect changes in new features by training for these features offline. However, these methods rely on the accuracy of the 3D reconstructions (which can be as high as ~1.7 m), fail under busy environments, and are ill-suited for detecting changes in continuous objects (e.g guard-rails) which further rely on camera parameters.

Discussion of references herein is given for more complete background and is not to be construed as an admission that such publications are prior art for patentability determination purposes.

BRIEF SUMMARY OF THE INVENTION

Embodiments of the present invention detect changes in environments across multiple traversals of areas of interest for maintenance and updating of HD Maps, using computer vision and deep learning technologies according to one or more of the appended claims.

According to an embodiment of the present invention, a neural network of modular components is used at least comprising a keyframe extraction module for processing two or more videos relating to separate traversals of an area of interest to which the HD map which is to be updated relates, a deep neural network module processing output of the keyframe extraction module, a change detection module processing output of the deep neural network module, and an auxiliary computations module which is designed to aid the change detection module. Accordingly, the invention provides an automated and modular pipeline for change detection using just the RGB videos such that the overall cost of maintenance and update of the HD maps is significantly reduced. Furthermore, since the method of the invention only updates the map where changes occur by using geotags of the changes (from the geotagged RGB videos), it is computationally inexpensive. According to the invention the pipeline is equipped to detect specific object/feature changes from geotagged RGB videos, and does so without need for 3D reconstructions and camera parameters, using deep neural networks that are trained offline on standard datasets for the required features, and therefore requiring no additional sensors to find the features. In the following disclosure template methods will be discussed for extracting changes from various kinds of features, both continuous as well as discrete. Additionally, as the changes are geotagged with image locations, they can be registered on HD Maps with low computational overhead. Further despite using low-end sensors like GPS and video cameras, the invention enables to detect relatively complex and extendable changes which have not been shown in the prior art.

In a preferred embodiment according to the invention the deep neural network module comprises a selection of network-modules for object classification, object detection, object tracking, depth estimation, semantic segmentation, and text recognition, respectively, wherein said modules are equipped to perform the following tasks:
  a. Semantic Segmentation Network module: estimates per-pixel classification from images.
  b. Depth Estimation Network module: estimates the depth of objects from just 2D images.
  c. Object Detection Network module: performs localization and classification and outputs bounding box coordinates, and labels along with confidence scores.
  d. Object Tracking Network module: tracks an object through all the frames of the videos and outputs the bounding box coordinates.

e. Object Classification Network module: classifies objects in the image and outputs the labels.

f. Text Recognition Network module: performs text recognition.

It is further preferred that the keyframe extraction module is designed to extract frames from the videos with corresponding GPS information and to align and output a sequence of frames with corresponding GPS coordinates, and/or that when corresponding GPS information is missing, the keyframe extraction module interpolates the frames to convert them into geo-tagged frames.

Advantageously the auxiliary computations module is arranged to calculate vanishing points in the video frames. The module can accommodate any further necessary computations.

It is further preferred that the change detection module processes output of the deep neural network module, while simultaneously using output from the auxiliary computations module.

Regarding the above meant template methods for extracting changes, it is possible that the change detection module is arranged with submodules to detect changes in a. Traffic Signs
b. Perpendicular Wall Barrier
c. Hatched markings
d. Text
e. Arrow
f. Overhead Structure
g. Traffic Barrier
h. Lane Boundary The gist and operation of the concerning submodules can be itemized as follows.

The submodule to detect whether traffic signs have been added or removed between different traversals represented by the videos to be processed comprises the tasks of object detection, tracking and classification taken from the deep neural network module, and a filtering block processing classification output of the deep neural network module to suppress false positives, followed by a framewise comparison to identify the changes in traffic signs.

The submodule to detect changes in perpendicular wall barrier obtains unit surface normals from depth maps as provided by the depth estimation network module, which are judged to be perpendicular to the surface, which unit surface normals are masked with the output of the semantic segmentation network module and subsequently denoised and subjected to a threshold test to provide an output of the perpendicular walls in each frame, wherein a change in such perpendicular wall barrier is extracted by comparing the detected perpendicular walls at all GPS locations.

The changes in hatched road markings that are used to separate traffic to ensure safety are provided by having the semantic segmentation network module segment the hatched markings from the images of different traversals pertaining to an area of interest, and forward these hatched markings to an area based filtering algorithm, the output of which is compared for said different traversals to detect the changes in the hatched road markings.

The changes in texts on signboards and the like are provided by having the semantic segmentation network module segment the texts from the images of different traversals pertaining to an area of interest, and forward these texts to a text recognizer to identify the textual content which is compared for said different traversals to detect the changes in the texts.

The detection of locations where arrow signs have been added or removed is provided by arranging that the semantic segmentation network module obtains masks for the arrow signs, wherein contours extracted from these masks are smoothed by a merge and prune algorithm, followed by a low pass filter across frames to remove spurious detections, wherein a timeseries signal marking the presence of arrows in each frame is generated for the frame sets of each traversal in the area of interest, and a Fourier transformation is applied for comparing a shift in the frame sets, wherein said shift is used to align the frames and compare the aligned frames for extraction of the changes.

The presence or absence of overhead structure faces such as tunnels and bridges is detected using the segmentation network module from the deep neural network module and the vanishing point calculation of the auxiliary computations module, wherein the segmentation mask in each frame is weighed using the vanishing point to get a weighted area representing a mass of the overhead structure, wherein a center of said mass is computed to estimate an approximate depth of the structure, and wherein a sequence of masses and centroids forming clusters around the actual structure and a timeseries signal are processed and compared to detect added or removed structures.

The locations of added or removed traffic barriers such as guardrails is detected using the semantic segmentation network module from the deep neural network module and the vanishing point calculation of the auxiliary computations module, wherein a mask is weighed in its frame using vanishing point calculation to get a weighted area representing the mass of the traffic barrier, whereafter this mass signal across frames is converted to correspond to a distance from the starting frame providing a timeseries signal which is processed and compared across traversals in the area of interest to find added or removed traffic barriers.

The locations of added or removed lane boundaries and determination of the type of lane boundary is detected using the semantic segmentation network module from the deep neural network module and the vanishing point calculation of the auxiliary computations module, wherein each frame is independently reduced to a tuple describing lane markings detected on the road from left to right, and defining the types and order of lane markings without their actual locations in the frame. Providing the tuple is executed by intersecting semantic segmentation masks for the lane boundary classes with edges, followed by line detection, noise filtering, and clustering/averaging of lines to single detection per lane boundary.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings:

FIG. 6 shows a Perpendicular Wall Schematic according to an embodiment of the present invention;

FIG. 7 shows a Filled Area Schematic according to an embodiment of the present invention;

DETAILED DESCRIPTION OF THE INVENTION

Figure 1:
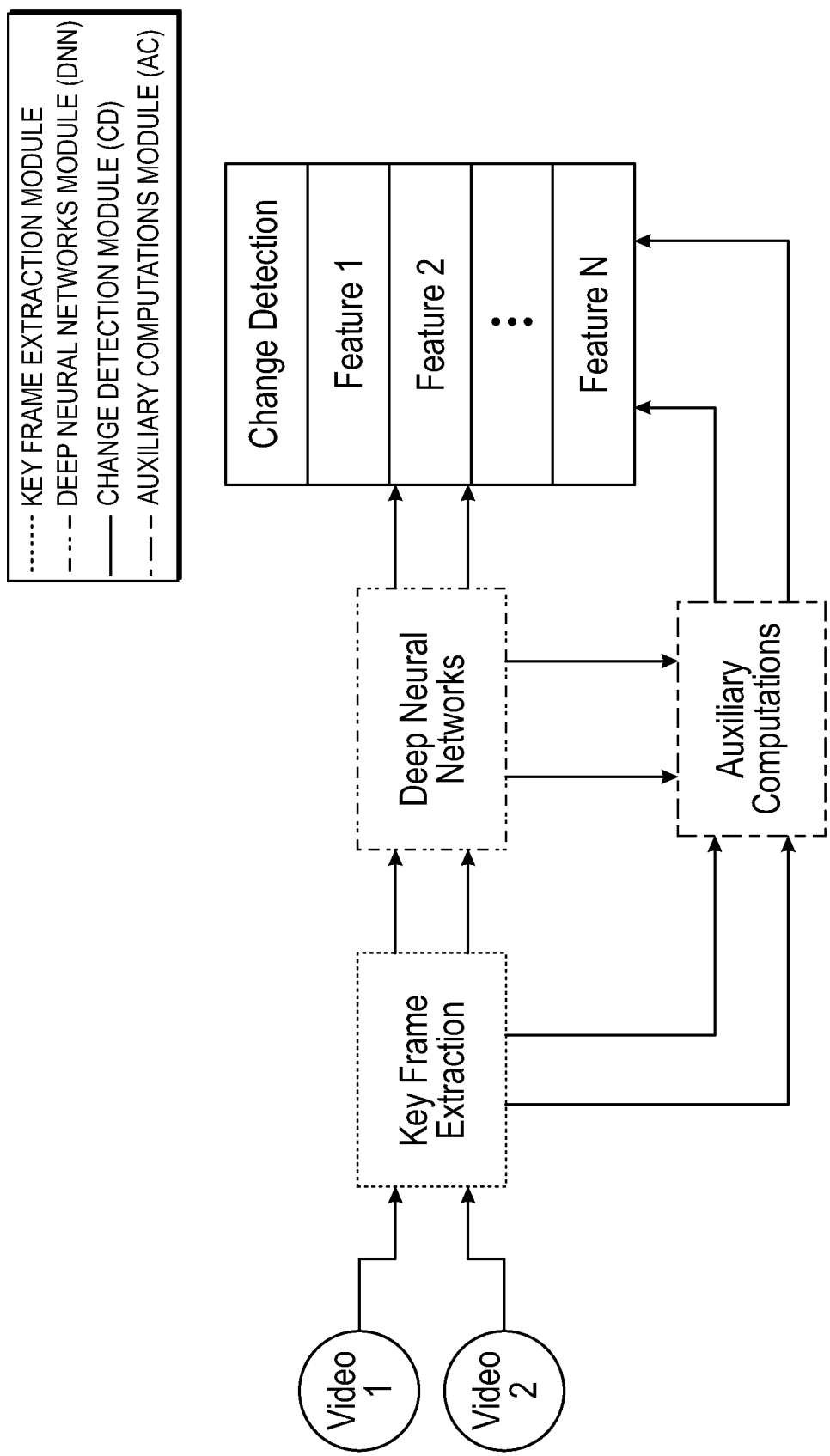
FIG. 1 shows an Overall Component Diagram according to an embodiment of the present invention.

With reference first to FIG. 1 it shows the change detection pipeline according to an embodiment of the present invention for updating HD maps, which has a modular architecture design and utilizes various techniques from classical Computer Vision, Signal Processing, and Deep Learning. It comprises four main components:

Key Frame Extraction module,
Deep Neural Networks module (DNN),
Change Detection module (CD), and
Auxiliary Computations module (AC) to aid Change Detection.

Figure 2:
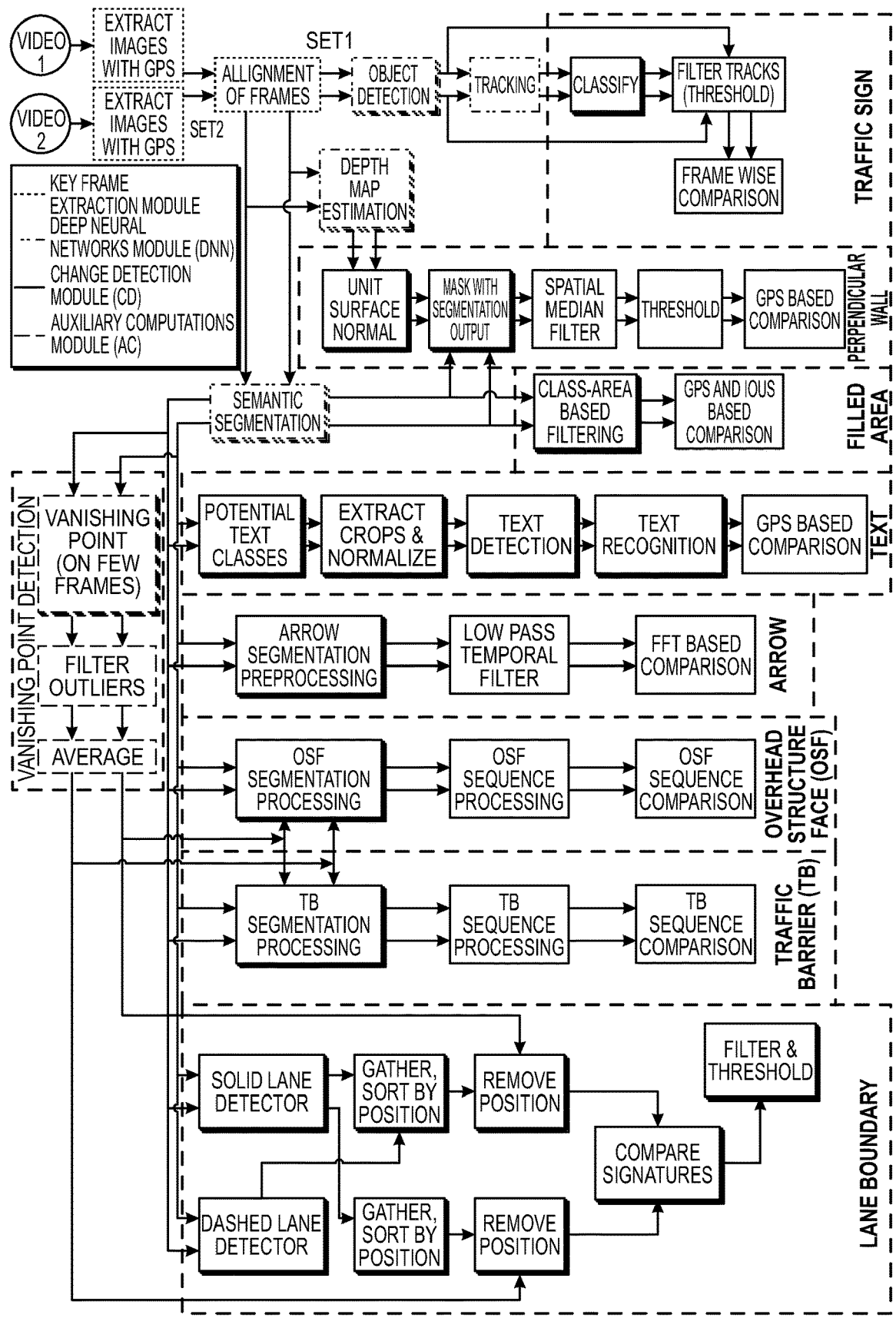
FIG. 2 shows an Overall Detailed Architecture according to an embodiment of the present invention.

The architecture of FIG. 1 is further detailed in FIG. 2.

The Key Frame Extraction module takes different geotagged videos, and provides geotagged aligned frame sequences for the fragment of path shared by both videos. These sets of frames then pass through a Deep Neural Networks (DNN) Module which comprises of network modules for classification, object detection, object tracking, depth estimation, and semantic segmentation. The outputs from these networks are sent to the Change Detection module. The Auxiliary Computation (AC) module has helper functions that employ methods from classical computer vision and signal processing to compute outputs that can be shared among different features in the Change Detection (CD) module. With this Modular design, it is possible to add, remove, or modify any feature-processing and its corresponding trained network in the DNN module or its AC module for the intended purpose.

Key Frame Extraction:

The key frame extraction component can be divided into two modules

Extraction of Images and GPS

Figure 3:
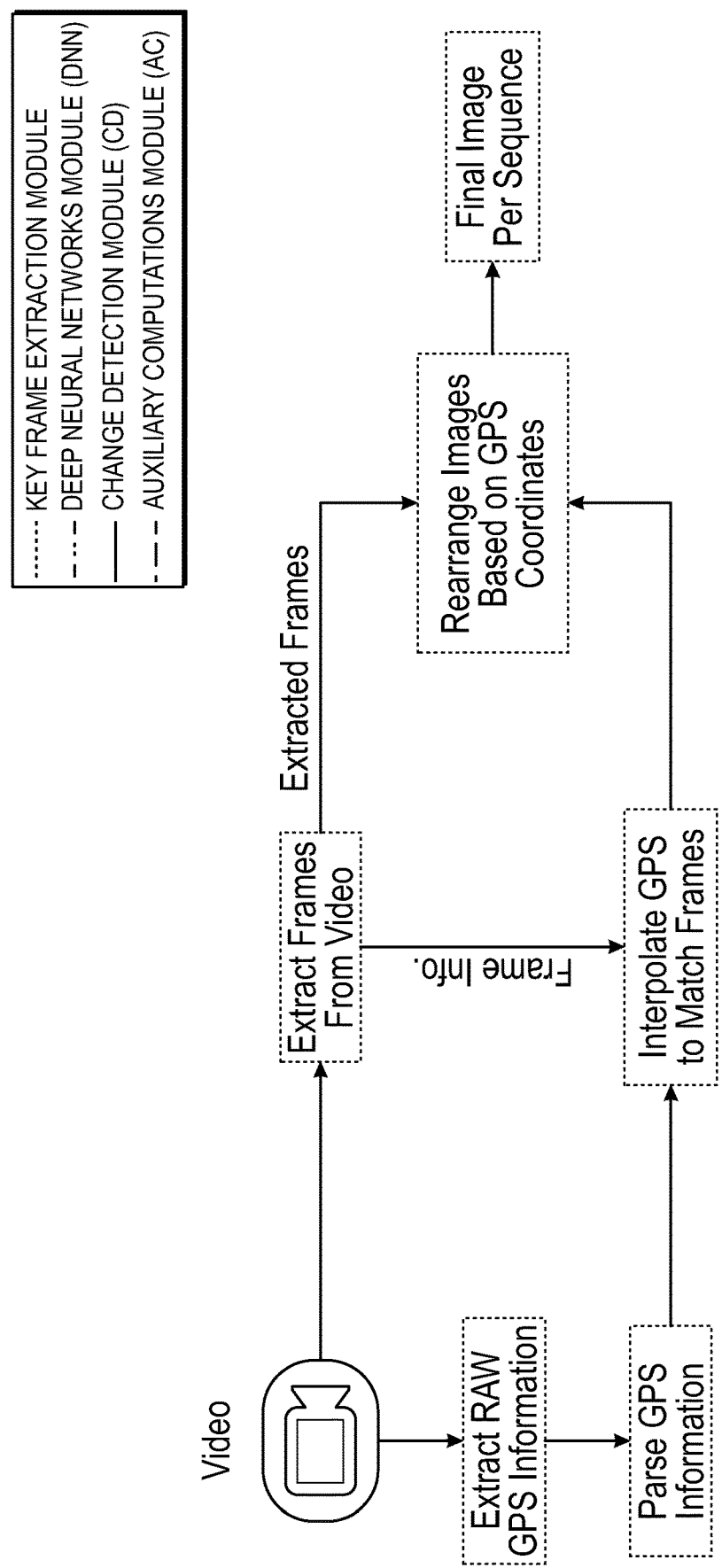
FIG. 3 shows features for Extraction of Images and GPS according to an embodiment of the present invention.

FIG. 3 shows the keyframe extraction which takes a geotagged video, and extracts its frames with corresponding GPS information. When the GPS information is sparse, interpolation is performed to geotag each frame. This module outputs a sequence of frames with its corresponding GPS coordinates for each traversal of the area of interest.

The Alignment of Frames

This block takes two traversals of geotagged frames and geographically aligns the two sequences of frames. For this, the subset of geographical region which overlaps between these two sequences is extracted. Then, the pairs of frames closest to each other are aligned.

Deep Neural Networks (DNNs):

Multiple deep learning networks are used in this module. Note that any network can be seamlessly integrated into this module as per user requirements. The invention uses the following networks:

1. Semantic Segmentation Network module: estimates per-pixel classification from images.
2. Depth Estimation Network module: estimates the depth of objects from just 2D images.
3. Object Detection Network module: performs localization and classification and outputs bounding box coordinates, labels along with confidence scores.
4. Object Tracking Network module: tracks an object through all the frames and outputs the bounding box coordinates.
5. Object Classification Network module: classifies objects in the image and outputs the labels.
6. Text Recognition Network module: performs text recognition.

Auxiliary Computations:

Change detection for some features will require auxiliary details beyond neural network outputs. This shared module computes these auxiliary details and sends them forward to the CD module. For example, to detect changes in Lane Boundary, Traffic Barrier, and Overhead Structure Face, the invention uses vanishing points that are computed once and shared across all the three submodules. Note that any other helper function can be easily plugged into this module and used by multiple functional modules in an efficient way.

Vanishing Point Computation

Figure 4:
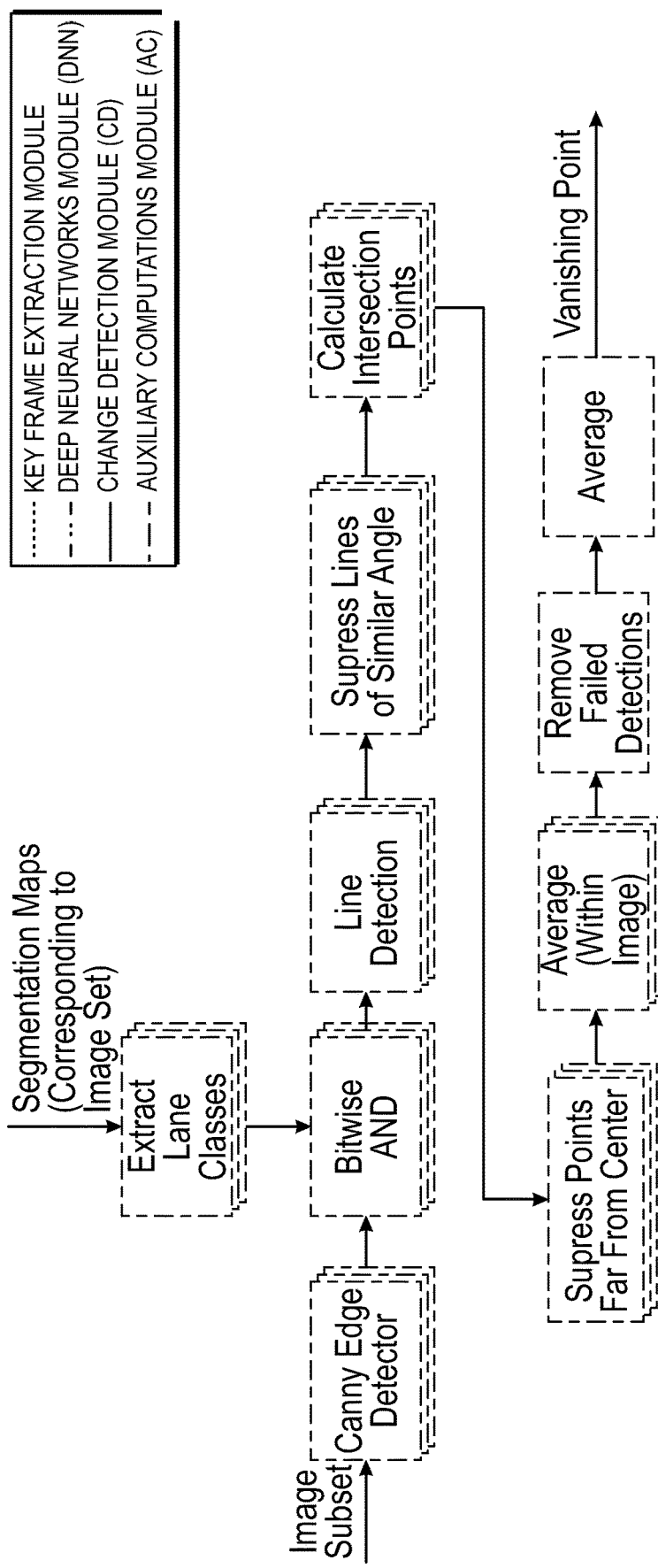
FIG. 4 shows Vanishing Point Calculation according to an embodiment of the present invention.

FIG. 4 depicts the module for vanishing point computation. A vanishing point is the point where parallel lines (such as lanes) in an image meet. To compute this, Canny Edge detection is applied on the RGB images. The detected edges are then intersected with the corresponding segmentation mask from the semantic segmentation network in the DNN module of the invention. This is followed by line detection using Hough Transform algorithm. Duplicate lines are removed, and the remaining lines are intersected pairwise to output potential vanishing points. These points are averaged per image, and the vanishing points from all the images are averaged again to get the final vanishing point.

Change Detection Module—General:

The output from the DNN module and the AC module are used to detect changes in a variety of features in the CD module. The following provides a detailed description of the change detection process for eight features. Changes are detected in:

1. Traffic Signs
2. Perpendicular Wall Barrier
3. Hatched markings
4. Text
5. Arrow
6. Overhead Structure
7. Traffic Barrier
8. Lane Boundary Description of each of these change detection features is explained below. Note that any new feature can be easily added in the modular pipeline of the invention for change detection. Furthermore, the proposed template approach can be used for detecting new features depending on the type of feature. For e.g. detecting changes in a new kind of road-marking according to the invention it is possible to repurpose methods that are used to detect changes in arrows and hatched-marking if it is a discrete marking, and lane boundary if it is a continuous road-marking.

Traffic Signs

Figure 5:
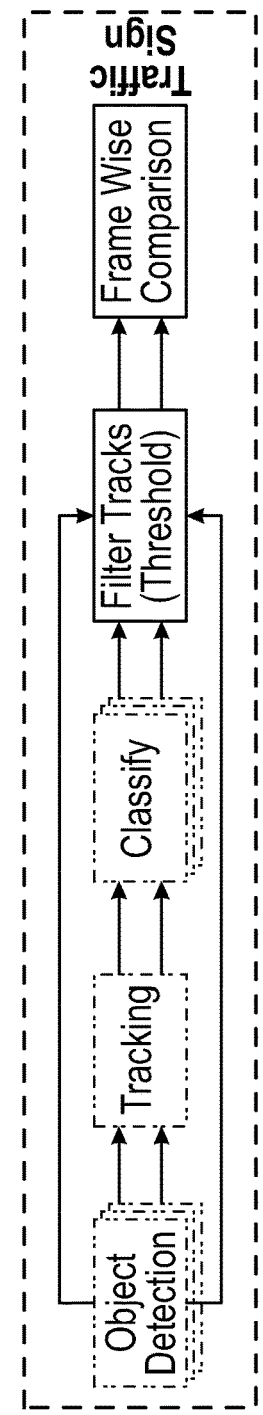
FIG. 5 shows a Traffic Sign change detection Schematic according to an embodiment of the present invention.

The objective of this sub-module (FIG. 5) is to detect changes where traffic signs have been added or removed between different traversals. FIG. 5 shows that Object Detection, Object Tracking, and Classification networks from the DNN module are used. The traffic signs in the images are predicted by the detection network. The tracking network is used on these results to further fine-tune the predictions. The classification network is used to classify the extensive sub-categories of the predicted traffic signs. A filtering block suppresses false positives and the final prediction coordinates are used to identify the changes in sign boards.

Perpendicular Wall Barrier

The objective of this sub-module (see FIG. 6) is to detect any wall barriers on the road that are perpendicular.

Unit surface normals from the depth maps are obtained from the Depth Estimation Network and are used to judge the "perpendicularity" of the surface to camera. The unit surface normals are masked using the output of the semantic segmentation network, and then denoised using a median filter. Finally, a thresholding function is used to output the perpendicular walls in each frame. The change is then extracted by comparing the presence or absence of perpendicular walls at all the GPS locations.

Hatched Markings

The objective of this sub-module, which is shown in FIG. 7, is to detect changes in the hatched road markings that are used to separate traffic to ensure safety.

The Semantic segmentation network module segments the "hatched marking" from the images. The areas extracted from these maps are then forwarded to an area-based filtering algorithm and the changes are detected by comparing the Intersection over union (IoU) between different traversals.

Text

Figure 8:
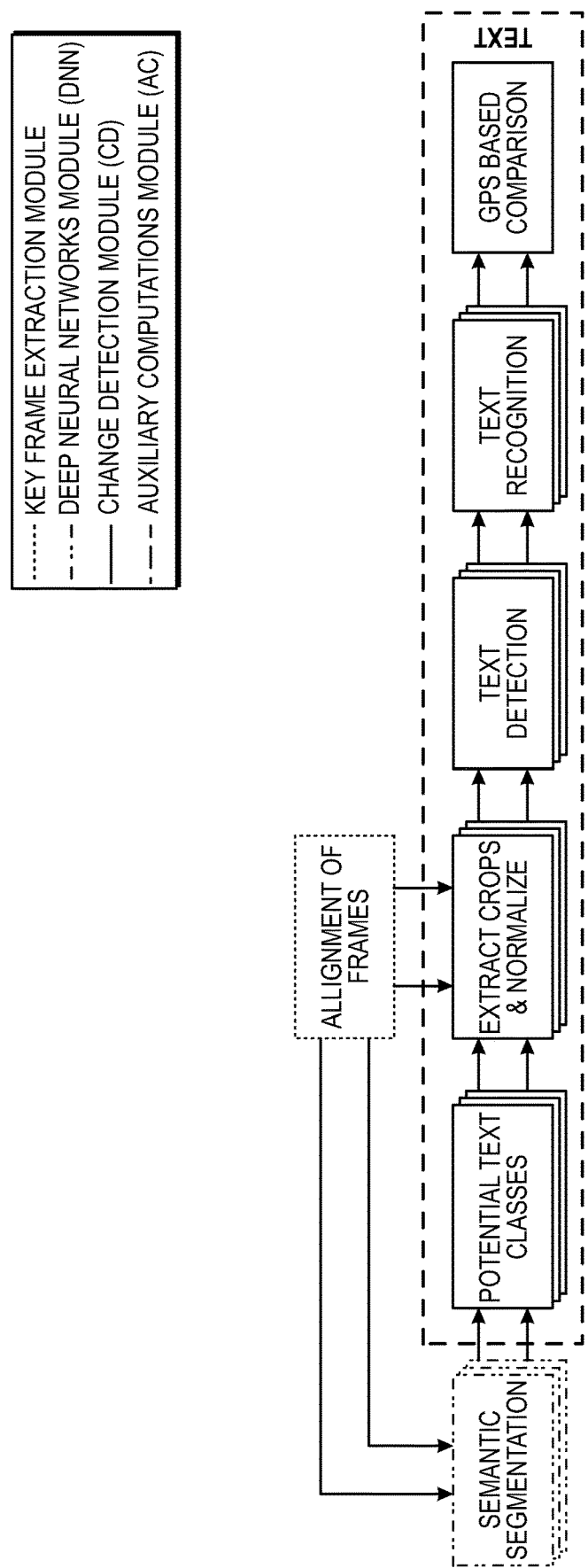
FIG. 8 shows a Text Detection Schematic according to an embodiment of the present invention.

The objective of this sub-module, shown in FIG. 8, is to detect changes in texts (on sign-boards, for e.g.) across different traversals. Unlike other features which are primarily concerned with addition and removal, changes to the textual content at the same locations have to be considered for this feature.

The semantic segmentation network module is used to identify changes in text. The masks of relevant classes i.e classes that usually contain text, are extracted from the segmentation output. The area containing the relevant class is cropped, resized, and passed through a text recognizer to identify the textual content. Finally, geotagged and aligned texts are compared between the two traversals to detect changes in text.

Arrow

Figure 9:
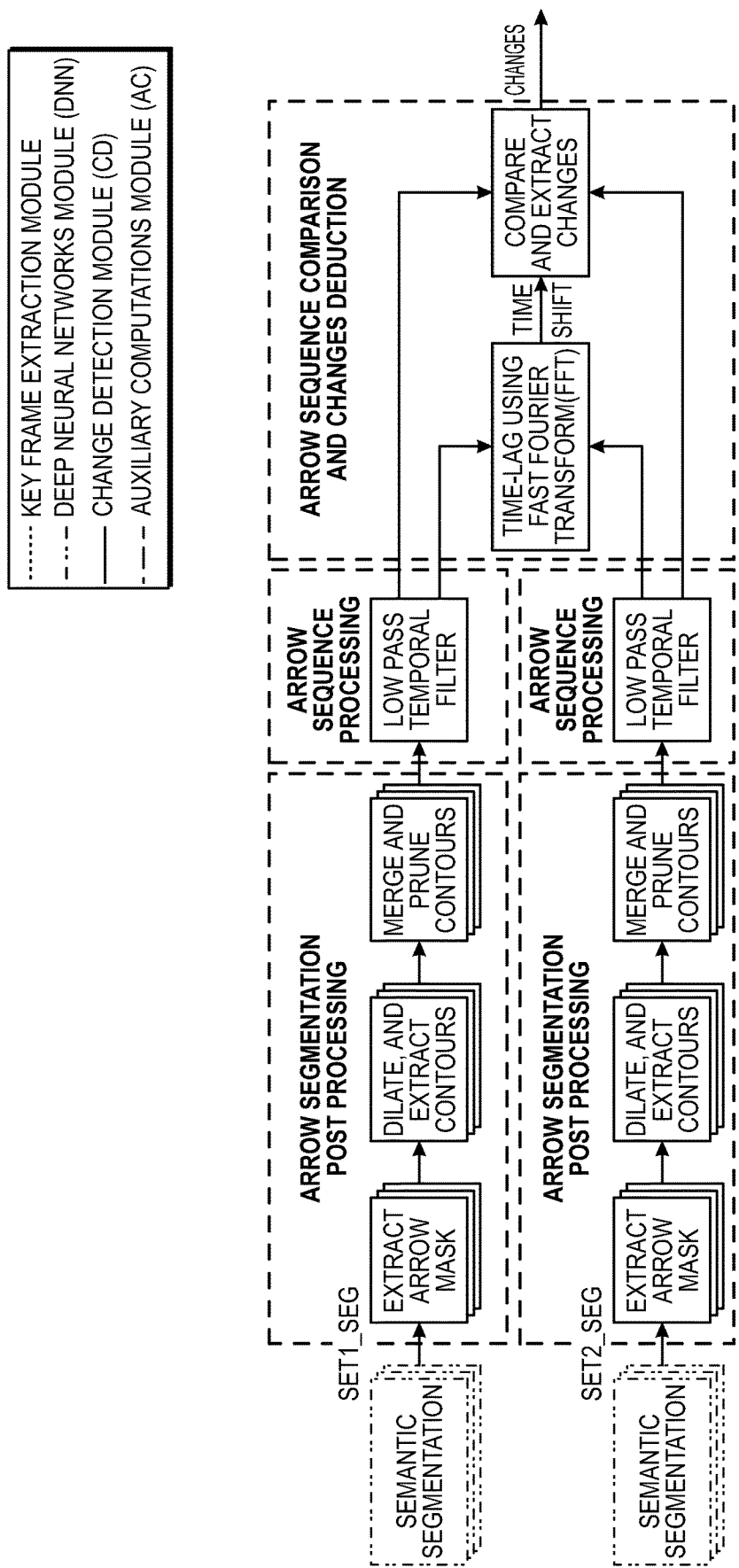
FIG. 9 shows Arrow Changes Calculations according to an embodiment of the present invention.
Figure 10:
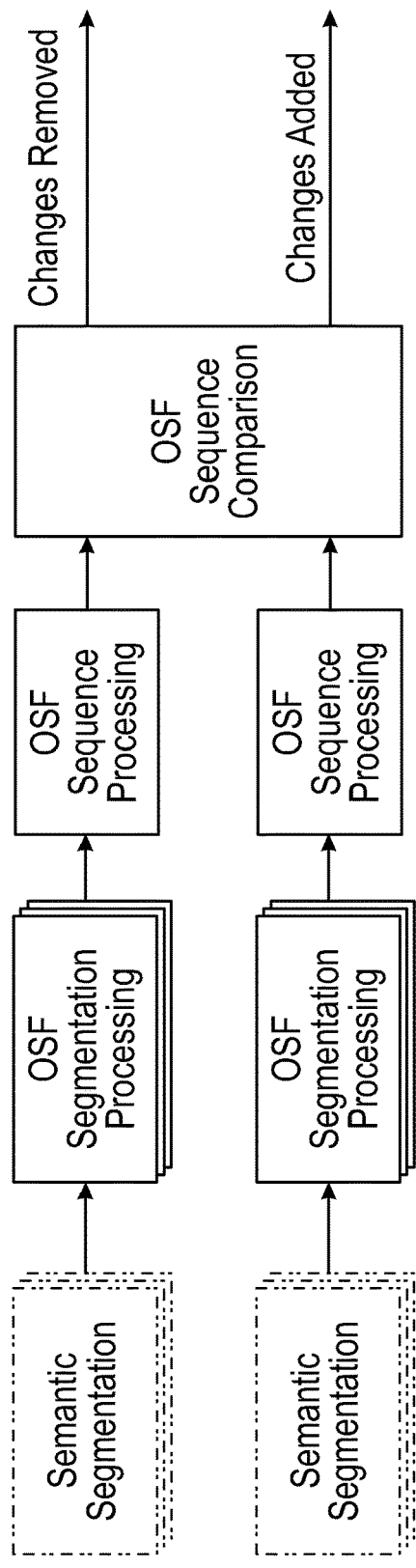
FIG. 10 shows an Overhead Structure Face Schematic according to an embodiment of the present invention.
Figure 11:
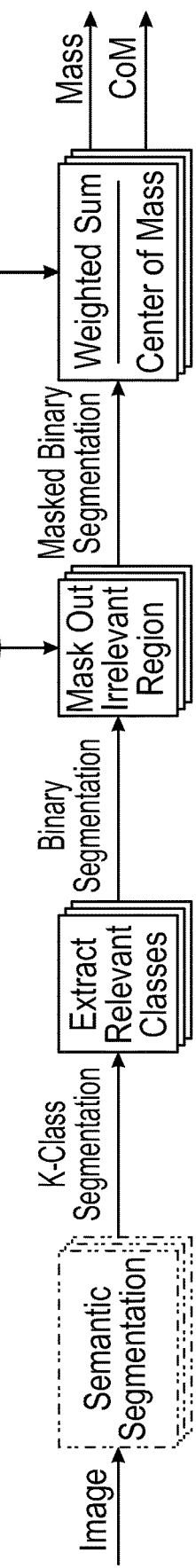
FIG. 11 shows in detail an OSF Segmentation Processing Module as shown in FIG. 10 according to an embodiment of the present invention.
Figure 12:
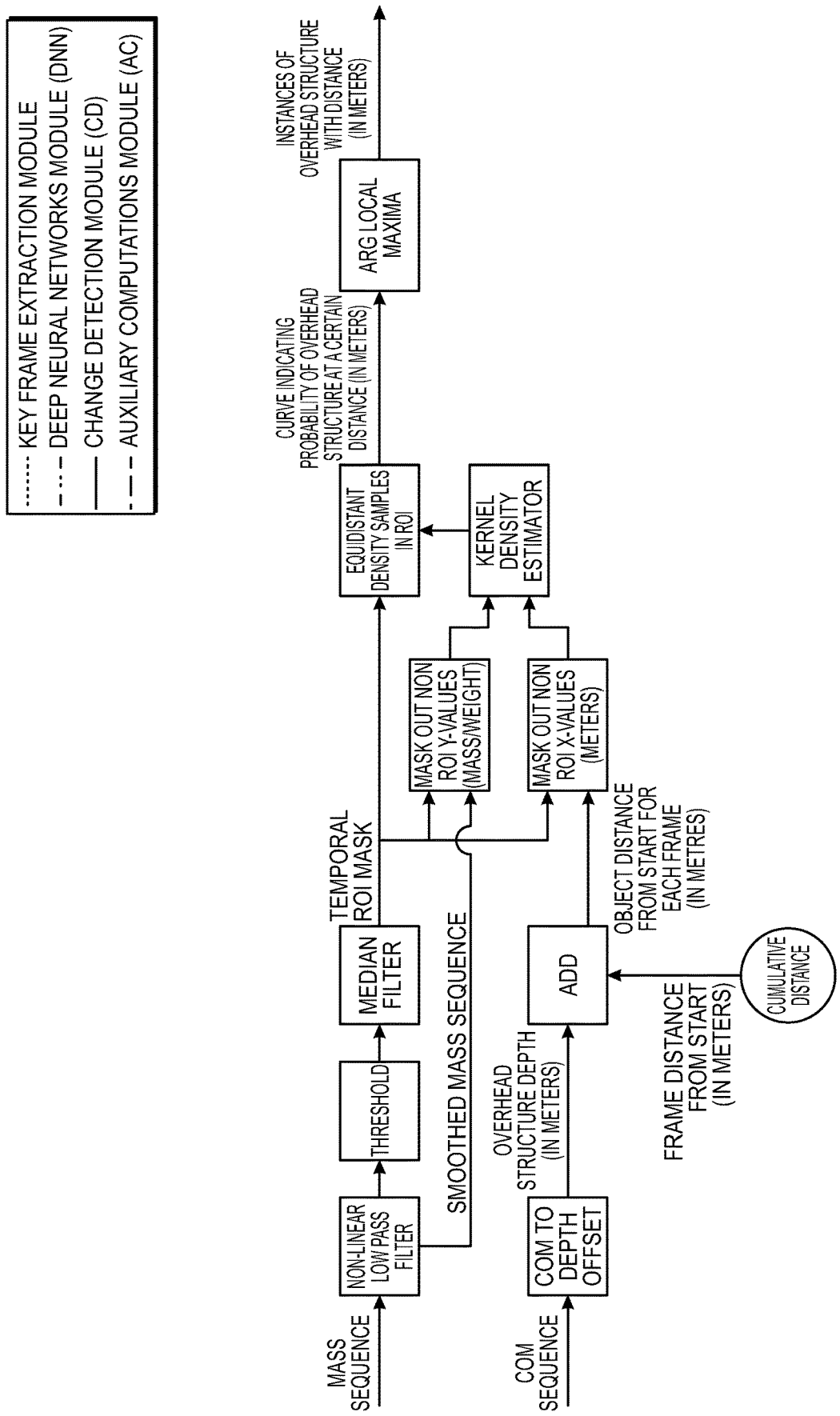
FIG. 12 shows in detail an OSF Sequence Processing Module as shown in FIG. 10 according to an embodiment of the present invention.
Figure 13:
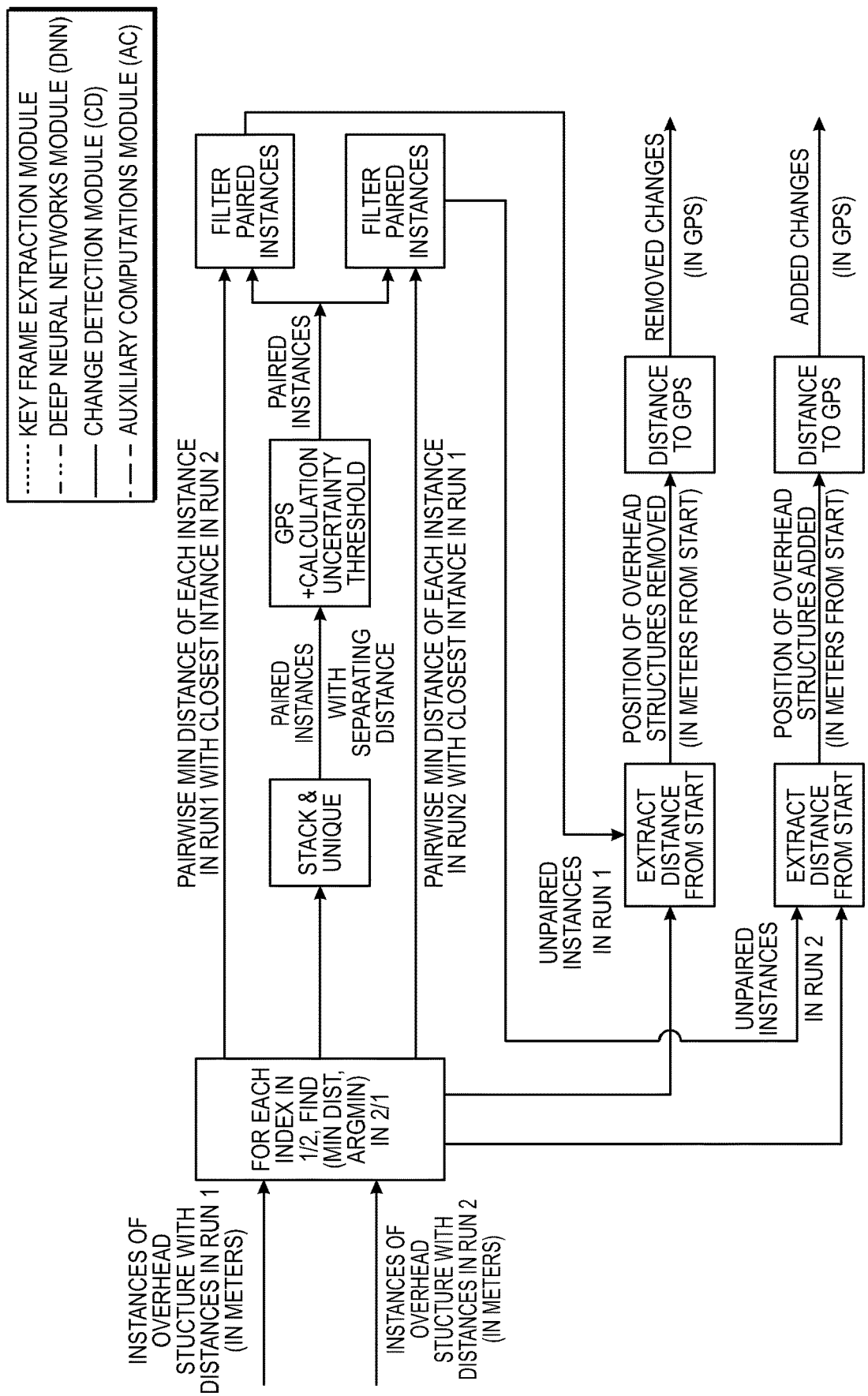
FIG. 13 shows in detail an OSF Sequence Comparison Module as shown in FIG. 10 according to an embodiment of the present invention.
Figure 14:
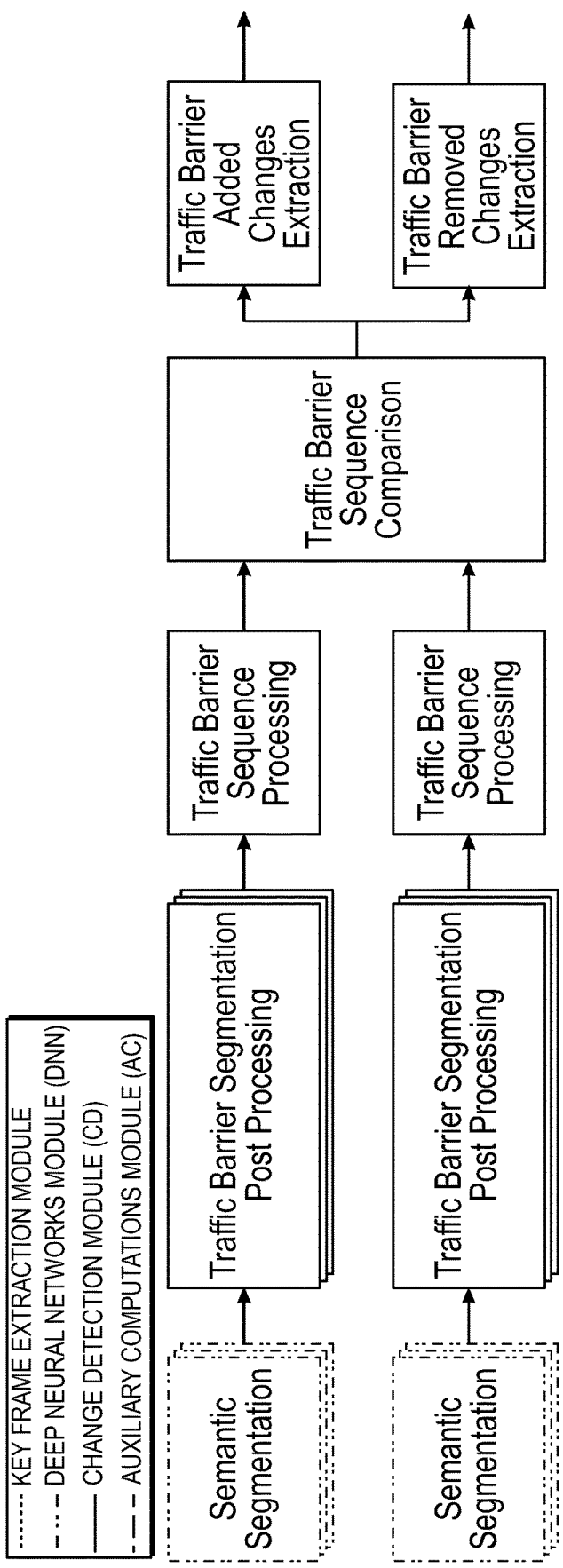
FIG. 14 shows a Traffic Barrier Schematic according to an embodiment of the present invention.
Figure 15:
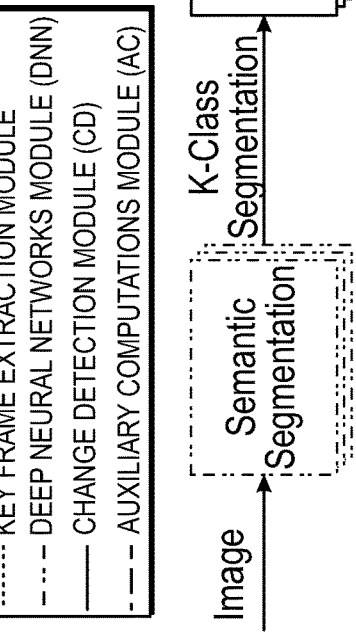
FIG. 15 shows in detail a Traffic Barrier Segmentation Post Processing Module as shown in FIG. 14 according to an embodiment of the present invention.
Figure 16:
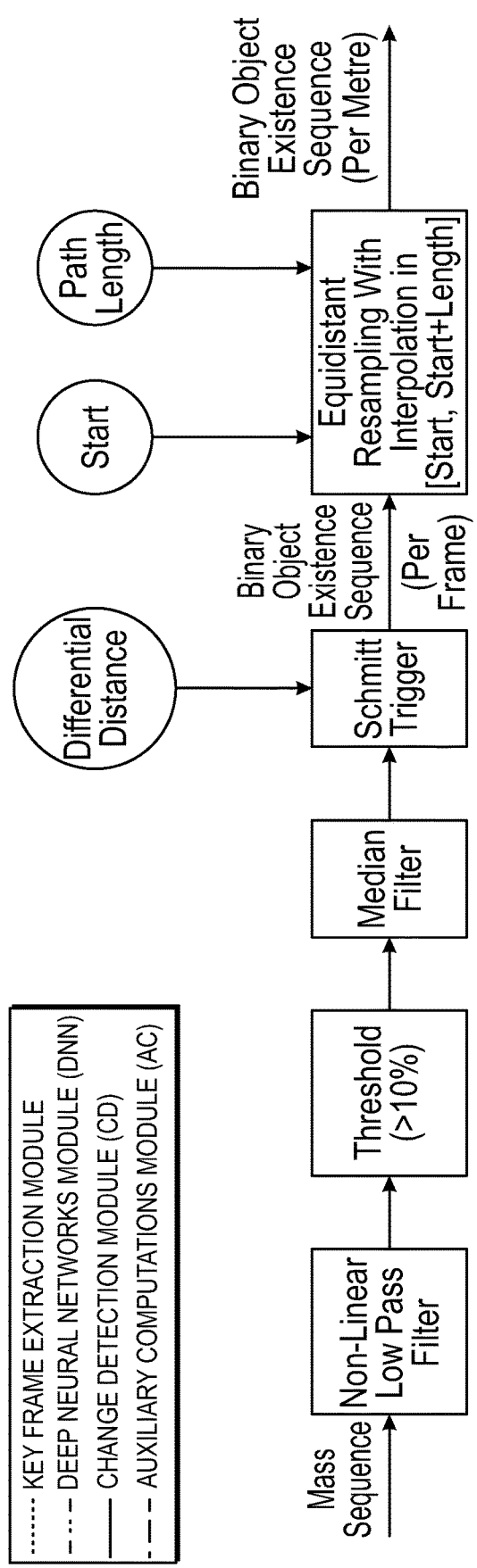
FIG. 16 shows in detail a Traffic Barrier Sequence Processing Module as shown in FIG. 14 according to an embodiment of the present invention.
Figure 17:
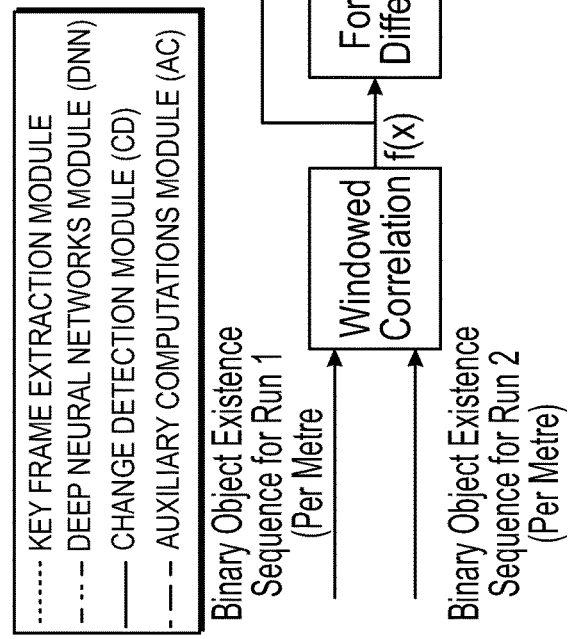
FIG. 17 shows in detail a Traffic Barrier Sequence Comparison Module as shown in FIG. 14 according to an embodiment of the present invention.
Figure 18:
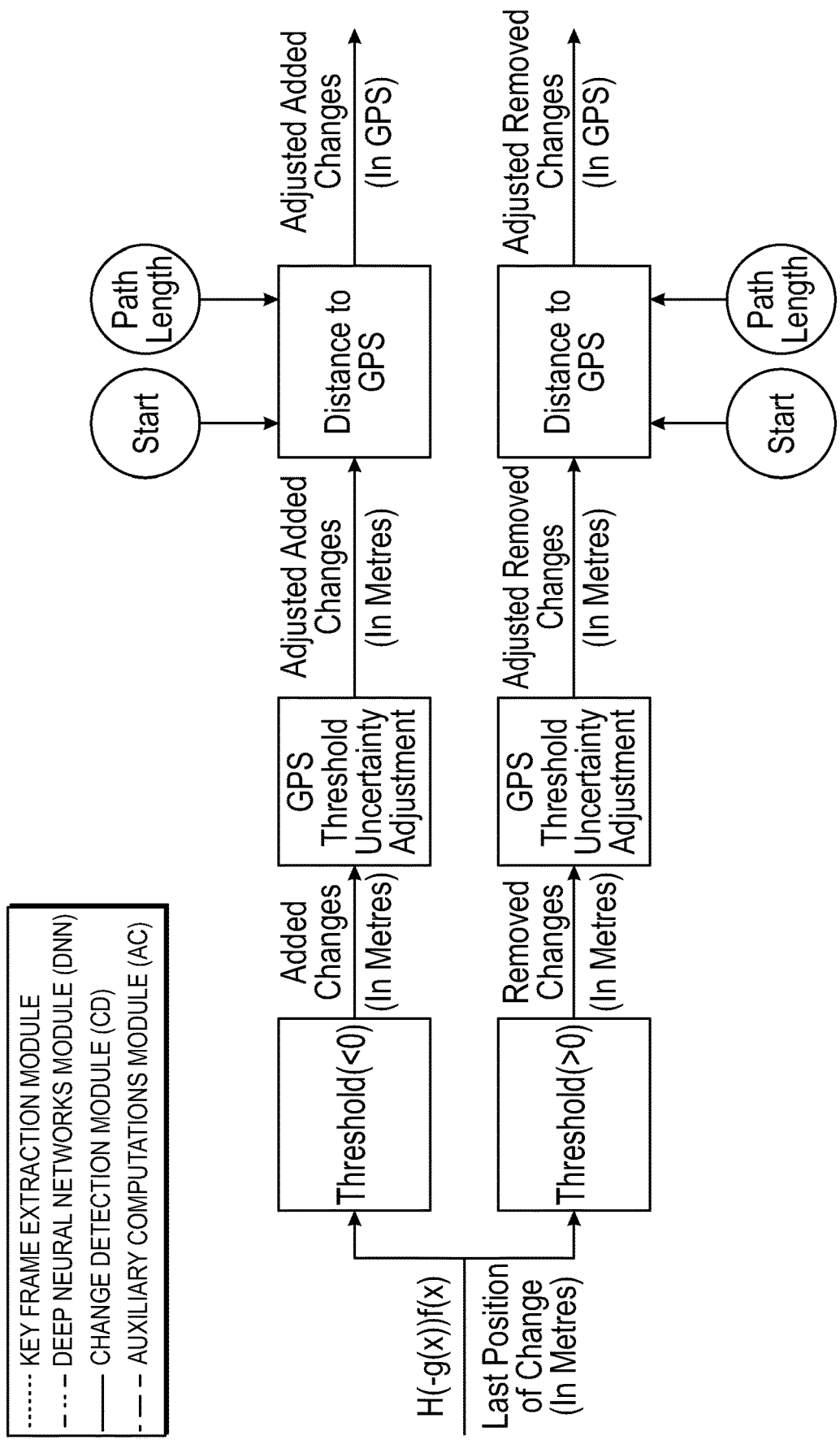
FIG. 18 shows in detail a Traffic Barrier Added/Removed Changes extraction Module as shown in FIG. 14 according to an embodiment of the present invention.

The objective of this sub-module, shown in FIG. 9, is to detect locations where arrow signs have been added/removed on the road. Output from the semantic segmentation network module is used to obtain masks for arrow signs. The contours extracted from these masks are smoothed by the merge-and-prune algorithm, followed by a low-pass filter across frames to remove spurious detections. A time-series signal marking presence as count of arrows in each frame, is then generated for frame sets from each traversal, and the shift between them is compared using Fourier Transform. This shift is finally used to further align the frames and compare them to extract the changes.

Overhead Structure Face (OSF)

The objective of this sub-module is to detect presence or absence in overhead structure faces such as tunnel/bridge. Details of the sub-module is shown in FIGS. 10-13. The segmentation network module from the DNN module and the vanishing points calculation from the AC module are used to detect this feature. The segmentation mask is weighed in each frame using vanishing point to get weighted area, hereafter referred to as the mass of the overhead structure. The center of mass on the vertical axis is also computed which is used to estimate an approximate depth of the structure. A sequence of masses and centroids form clusters around the actual structure and a time-series signal is then processed and compared to find added or removed structures.

Traffic Barrier

The objective of this sub-module, shown in FIGS. 14-18, is to detect locations of addition/removal of traffic barriers.

The output of the semantic segmentation network module and vanishing points calculation (from AC module) are used to find changes in guard-rail. First, the mask is weighed in each frame using vanishing point to get weighted area, hereafter referred to as the mass of the guard-rail. Then, this mass signal across frames is converted to correspond to the distance from the starting frame, rather than frames or GPS. This time-series signal is then processed and compared across the traversals to find added or removed guard-rails.

Lane Boundary

Figure 19:
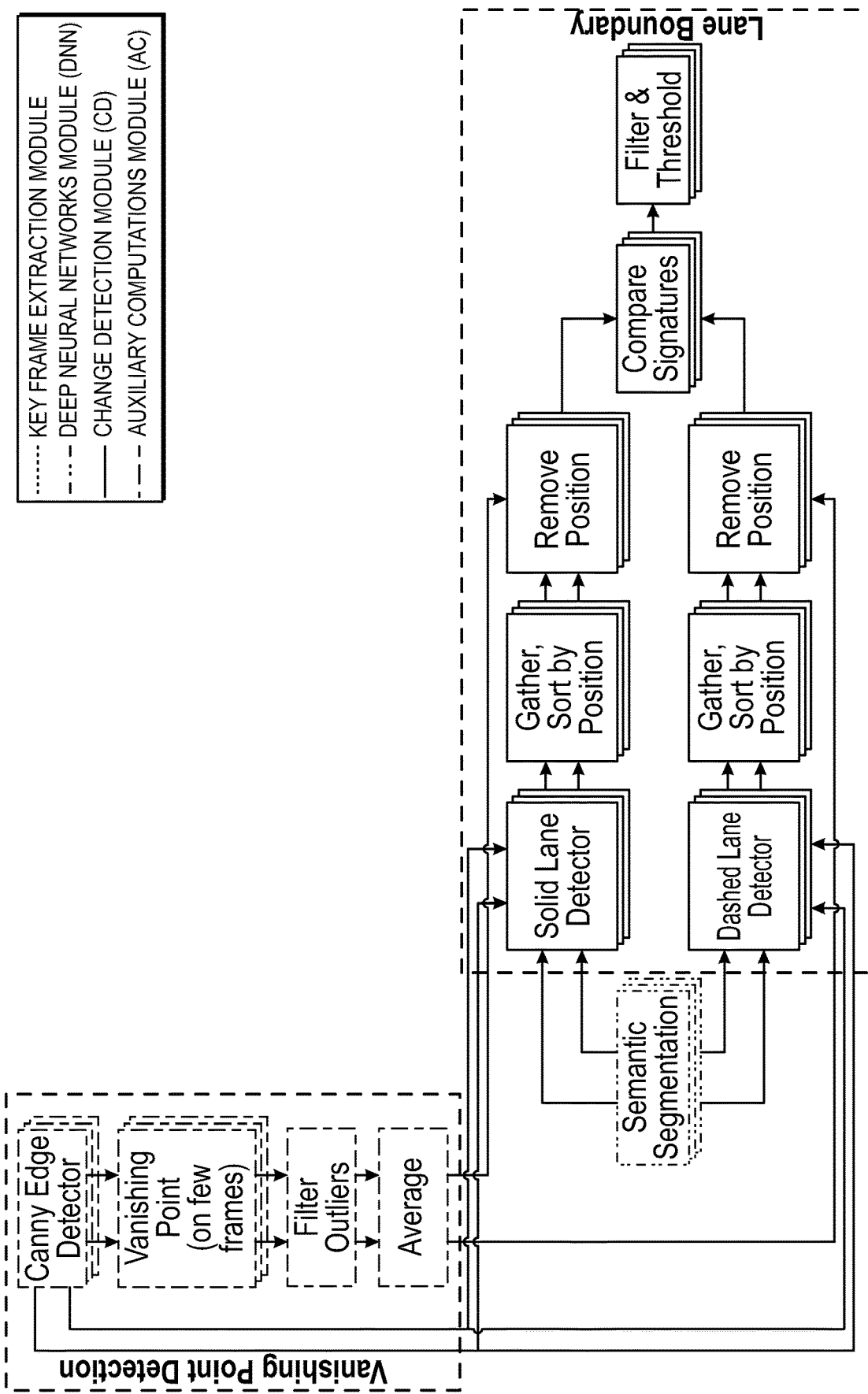
FIG. 19 shows a Lane Boundary Schematic according to an embodiment of the present invention.
Figure 20:
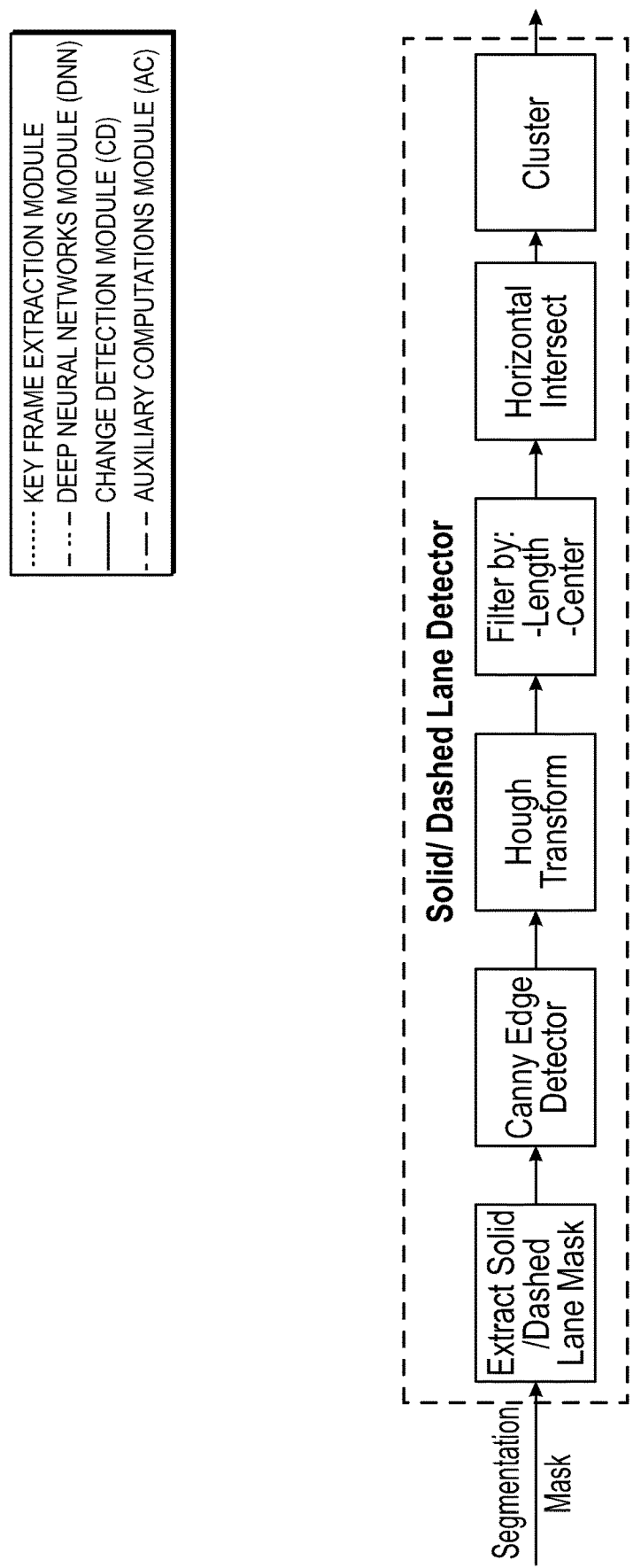
FIG. 20 shows in detail a Solid/Dashed Lane Detector as shown in FIG. 19 according to an embodiment of the present invention.

The objective of this sub-module, shown in FIGS. 19 and 20, is to detect locations of addition/removal of lane boundary, and when the type of lane boundary switches between "solid" and "dashed". The outputs from the semantic segmentation network module from the DNN module and the vanishing points calculation from the AC module are used to identify changes in lane markings. Every frame is independently reduced to a tuple describing lane markings detected on the road from left-to-right. The tuple contains the types and order of lane markings, but not actual locations in the frame. This is done by intersecting semantic segmentation masks for the lane boundary classes with edges, followed by line detection, noise filtering, and clustering/averaging of lines to single detection per lane boundary. The pipeline is then shared for both classes of lane boundaries (however, the hyperparameters could be tuned separately) and can be parallelized.

Embodiments of the present invention can include every combination of features that are disclosed herein independently from each other. Although the invention has been discussed in the foregoing with reference to an exemplary embodiment of the method of the invention, the invention is not restricted to this particular embodiment which can be varied in many ways without departing from the invention. The discussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguration of their relationships with one another.

Optionally, embodiments of the present invention can include a general or specific purpose computer or distributed system programmed with computer software implementing steps described above, which computer software may be in any appropriate computer language, including but not limited to C++, FORTRAN, ALGOL, BASIC, Java, Python, Linux, assembly language, microcode, distributed programming languages, etc. The apparatus may also include a plurality of such computers/distributed systems (e.g., connected over the Internet and/or one or more intranets) in a variety of hardware implementations. For example, data processing can be performed by an appropriately programmed microprocessor, computing cloud, Application Specific Integrated Circuit (ASIC), Field Programmable Gate Array (FPGA), or the like, in conjunction with appropriate memory, network, and bus elements. One or more processors and/or microcontrollers can operate via instructions of the computer code and the software is preferably stored on one or more tangible non-transitive memory-storage devices.

REFERENCES

1. C. Kim, S. Cho, M. Sunwoo, P. Resende, B. Bradaï and K. Jo, "Updating Point Cloud Layer of High Definition (HD) Map Based on Crowd-Sourcing of Multiple Vehicles Installed LiDAR," in IEEE Access, vol. 9, pp. 8028-8046, 2021, doi: 10.1109/ACCESS.2021.3049482.
2. L. Wellhausen, R. Dubé, A. Gawel, R. Siegwart and C. Cadena, "Reliable real-time change detection and mapping for 3D LiDARs," 2017 IEEE International Symposium on Safety, Security and Rescue Robotics (SSRR), 2017, pp. 81-87, doi: 10.1109/SSRR.2017.8088144.
3. F. Ferri, M. Gianni, M. Menna and F. Pirri, "Dynamic obstacles detection and 3D map updating," 2015 IEEE/RSJ International Conference on Intelligent Robots and Systems (IROS), 2015, pp. 5694-5699, doi: 10.1109/IROS.2015.7354185.
4. J. P. Underwood, D. Gillsjö, T. Bailey and V. Vlaskine, "Explicit 3D change detection using ray-tracing in spherical coordinates," 2013 IEEE International Conference on Robotics and Automation, 2013, pp. 4735-4741, doi: 10.1109/ICRA.2013.6631251.
5. Video Alignment for Change Detection—Ferran Diego, Daniel Ponsa, Joan Serrat, Antonio M López
6. Fast Change Detection for Camera-based Surveillance Systems—Matthias Michael; Christian Feist; Florian Schuller; Marc Tschentscher
7. HD Map Change Detection with a Boosted Particle Filter—David Pannen; Martin Liebner; Wolfram Burgard
8. How to Keep HD Maps for Automated Driving Up To Date—David Pannen; Martin Liebner; Wolfgang Hempel; Wolfram Burgard
9. Real-Time HD Map Change Detection for Crowdsourcing Update Based on Mid-to-High-End Sensors—Pan Zhang, Mingming Zhang, Jingnan Liu
10. Automatic Map Update Using Dashcam Videos—Aziza Zhanabatyrova, Clayton Souza Leite, Yu Xiao

The invention claimed is:

1. An AI based change detection system for executing a method to detect changes in geo-tagged videos to update HD maps, the method employing a neural network of modular components at least comprising a keyframe extraction module for processing two or more videos relating to separate traversals of an area of interest to which the HD map which is to be updated relates, a deep neural network module processing output of the keyframe extraction module, a change detection module processing output of the deep neural network module and while simultaneously using output from an auxiliary computations module which is designed to aid the change detection module, wherein the keyframe extraction module is designed to extract frames from the videos with corresponding GPS information and to align and output a sequence of frames with corresponding GPS coordinates, and/or that when corresponding GPS information is missing, the keyframe extraction module interpolates the frames to convert them into geo-tagged frames;

the deep neural network module comprising a selection of network-modules for object classification, object detection, object tracking, depth estimation, semantic segmentation, and text recognition, respectively, wherein the modules are equipped to:
Semantic Segmentation Network module: estimates per-pixel classification from images;
Depth Estimation Network module: estimates the depth of objects from just 2D images;
Object Detection Network module: performs localization and classification and outputs bounding box coordinates, and labels along with confidence scores;
Object Tracking Network module: tracks an object through all the frames of the videos and outputs the bounding box coordinates;
Object Classification Network module: classifies objects in the image and outputs the labels;
Text Recognition Network module: performs text recognition;

the change detection module being arranged with submodules to detect changes in one or more of:
  traffic signs;
  perpendicular wall barriers;
  hatched markings;
  text;
  arrows;
  overhead structures;
  traffic barriers; and
  lane boundaries;
the AI based change detection system further comprising an element selected from the list consisting of:
  wherein detection of locations where arrow signs have been added or removed is provided by arranging that the semantic segmentation network module obtains masks for the arrow signs, wherein contours extracted from these masks are smoothed by a merge and prune algorithm, followed by a low pass filter across frames to remove spurious detections, wherein a timeseries signal marking the presence of arrows in each frame is generated for the frame sets of each traversal in the area of interest, and a Fourier transformation is applied for comparing a shift in the frame sets, wherein said shift is used to align the frames and compare the aligned frames for extraction of the changes;
  wherein the overhead structures comprise the faces of tunnels or bridges and the presence or absence of the overhead structures is detected using the segmentation network module from the deep neural network module and the vanishing point calculation of the auxiliary computations module, wherein the segmentation mask in each frame is weighed using the vanishing point to get a weighted area representing a mass of the overhead structure, wherein a center of said mass is computed to estimate an approximate depth of the structure, and wherein a sequence of masses and centroids forming clusters around the actual structure and a timeseries signal are processed and compared to detect added or removed structures;
  wherein the traffic barriers comprise guardrails and the locations of added or removed traffic barriers are detected using the semantic segmentation network module from the deep neural network module and the vanishing point calculation of the auxiliary computations module, wherein a mask is weighed in its frame using vanishing point calculation to get a weighted area representing the mass of the traffic barrier, whereafter this mass signal across frames is converted to correspond to a distance from the starting frame providing a timeseries signal which is processed and compared across traversals in the area of interest to find added or removed traffic barriers;
  wherein the locations of added or removed lane boundaries and determination of the type of lane boundary is detected using the semantic segmentation network module from the deep neural network module and the vanishing point calculation of the auxiliary computations module, wherein each frame is independently reduced to a tuple describing lane markings detected on the road from left to right, and defining the types and order of lane markings without their actual locations in the frame;
  wherein providing the tuple is executed by intersecting semantic segmentation masks for the lane boundary type with edges, followed by line detection, noise filtering, and clustering/averaging of lines to single detection per lane boundary; and
  a combination thereof.

2. The AI based change detection system of claim 1, wherein the auxiliary computations module is arranged to calculate vanishing points in the video frames enabling their use by the other modules of the system.

3. The AI based change detection system of claim 1, wherein the change detection module processes output of the deep neural network module, while simultaneously using output from the auxiliary computations module.

4. The AI based change detection system of claim 3, wherein the submodule to detect whether traffic signs have been added or removed between different traversals represented by the videos to be processed comprises the tasks of object detection, tracking and classification taken from the deep neural network module, and a filtering block processing classification output of the deep neural network module to suppress false positives, followed by a framewise comparison to identify the changes in traffic signs.

5. The AI based change detection system of claim 1, wherein the submodule to detect changes in perpendicular wall barrier obtains unit surface normals from depth maps as provided by the depth estimation network module, which are judged to be perpendicular to the surface, which unit surface normals are masked with the output of the semantic segmentation network module and subsequently denoised and threshold to provide an output of the perpendicular walls in each frame, wherein a change in such perpendicular wall barrier is extracted by comparing the detected perpendicular walls at all GPS locations.

6. The AI based change detection system of claim 1, wherein the hatched markings are hatched road markings and changes in hatched road markings that are used to separate traffic to ensure safety are provided by having the semantic segmentation network module segment the hatched markings from the images of different traversals pertaining to an area of interest, and forward these hatched road markings to an area based filtering algorithm, the output of which is compared for said different traversals to detect the changes in the hatched road markings.

7. The AI based change detection system of claim 1, wherein the text comprises text on signboards and changes in text on signboards are provided by having the semantic segmentation network module segment objects with texts from the images of different traversals pertaining to an area of interest, and forward these texts to a text recognizer to identify the textual content which is compared for said different traversals to detect the changes in the texts.

* * * * *